(12) United States Patent
Boer

(10) Patent No.: US 6,782,708 B1
(45) Date of Patent: Aug. 31, 2004

(54) AIR CONDITIONER COIL ACCESS DOOR KIT AND METHOD OF INSTALLATION

(76) Inventor: James R. Boer, P.O. Box 310, Cortaro, AZ (US) 85652

( * ) Notice: Subject to any disclaimer, the term of this patent is extended or adjusted under 35 U.S.C. 154(b) by 0 days.

(21) Appl. No.: 10/627,879

(22) Filed: Jul. 28, 2003

(51) Int. Cl.[7] .............................................. F25D 17/08
(52) U.S. Cl. .......................................... 62/298; 62/426
(58) Field of Search ......................... 62/77, 259.1, 298, 62/426, 427, 428, 429

(56) References Cited

U.S. PATENT DOCUMENTS

| | | | | |
|---|---|---|---|---|
| 4,189,987 A | * | 2/1980 | Amberg et al. | 454/137 |
| 5,046,327 A | * | 9/1991 | Walker et al. | 62/244 |
| 5,368,620 A | * | 11/1994 | Chiba et al. | 96/414 |
| 5,370,576 A | * | 12/1994 | Krofchalk | 454/143 |
| 5,501,634 A | * | 3/1996 | Wilder | 454/136 |
| 6,196,308 B1 | * | 3/2001 | Halligan | 165/203 |
| 6,230,510 B1 | * | 5/2001 | Price | 62/263 |
| 6,293,860 B1 | | 9/2001 | Kim | |

* cited by examiner

Primary Examiner—William E. Tapolcai
(74) Attorney, Agent, or Firm—Richard C. Litman

(57) ABSTRACT

The air conditioner coil access door kit and method of installation includes a kit having a template, a hinged access door, and double sided adhesive tape, and also includes a procedure for using the kit to install the hinged access door onto an OEM air conditioning coil housing. The template and door are preferably triangular in shape. The template is attached to the coil housing between the air filter and the evaporator coil using the double sided tape, a hole is cut in the housing using the template as a guide, and the hinged door is attached to the template, also by double sided adhesive tape. The door permits insertion of a vacuum cleaner nozzle into the housing for cleaning the evaporator coil.

9 Claims, 5 Drawing Sheets

AIR CONDITIONER COIL ACCESS DOOR KIT AND METHOD OF INSTALLATION

BACKGROUND OF THE INVENTION

1. Field of the Invention

The present invention relates to semi-truck air conditioning systems, and more particularly, to a method and a kit for modifying the existing OEM air conditioning system of a semi-truck to equip the evaporator coil housing with a hinged access door that facilitates quick and easy cleaning of the evaporator coil.

2. Description of the Related Art

Although most semi-truck air conditioning systems include an intake air filter, typically small amounts of dust and fine particles still continually enter the system by either being sucked through the filter or through cracks or spaces between the filter and the air conditioning housing. Usually these dust and fine particles then accumulate on the outer surfaces of the evaporator coil, thereby reducing airflow through the system by as much as 35 percent. Additionally, as dust and fine particles collect on the evaporator coil, the coil presents an ideal location for mold and mildew to cultivate. Such mold and mildew, of course, contributes to foul and unhealthy air in the truck cab.

Typically, cleaning the evaporator coil requires both disassembly of portions of the air conditioning system by a qualified mechanic, and removal and replacement of the freon in the system. Thus, cleaning of the coil, which typically is required at least once a year under normal use, is costly.

U.S. Pat. No. 6,293,860 issued Sep. 25, 2001 to S. Kim teaches a motor vehicle passenger compartment air-cleaner that is installed onto existing OEM automobile ventilation and air conditioning systems to filter air passing through a dashboard outlet and into the passenger compartment. However, while this device does help prevent air contaminants from passing into the passenger compartment, it does nothing to facilitate the removal of debris from the evaporator coil or to alleviate the loss of airflow due to the accumulation on the coil.

None of the above inventions and patents, taken either singly or in combination, is seen to describe the instant invention as claimed. Thus an air-conditioner coil access door kit and method of installation solving the aforementioned problems is desired.

SUMMARY OF THE INVENTION

The air conditioner coil access door kit and method of installation includes a kit having a template, a hinged access door, and double-sided adhesive tape. The method of installation includes steps of removing the trim, taping the template to the air box, using the template to cut a door opening in the air box, using the double-sided tape to install the door over the opening, and reinstalling the trim. The present invention also extends to an air condition coil housing having a hinged access door for easy cleaning of the evaporator coil contained therein made as original equipment for an automotive air conditioning system.

Accordingly, it is a principal object of the invention to provide an air conditioner coil access door kit having a hinged access door and means for installing the hinged access door to an OEM air conditioning coil housing.

It is another object of the invention to provide quick and easy access to the evaporator coil in an OEM air conditioning coil housing thereby allowing for ease of cleaning the evaporator coil and reducing the cost associated with such cleaning.

It is a further object of the invention to provide a procedure for installing a hinged access door to an OEM air conditioning coil housing.

Still another object of the invention is to provide an air conditioning coil housing having a hinged access door allowing easy access to the evaporator coil.

It is yet another object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
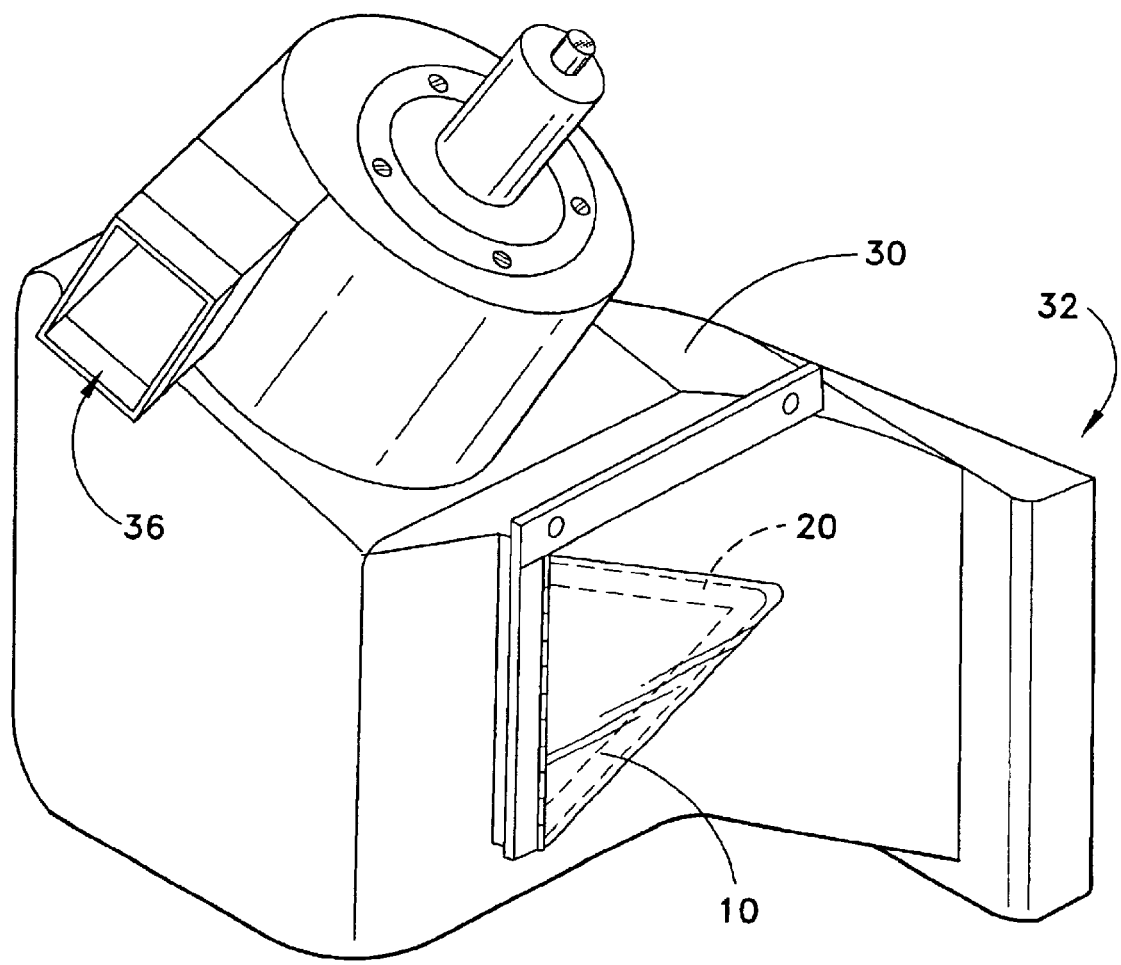
FIG. 1 is an environmental, perspective view of an air conditioner coil housing having an access door according to the present invention installed therein, the door being closed.
Figure 2:
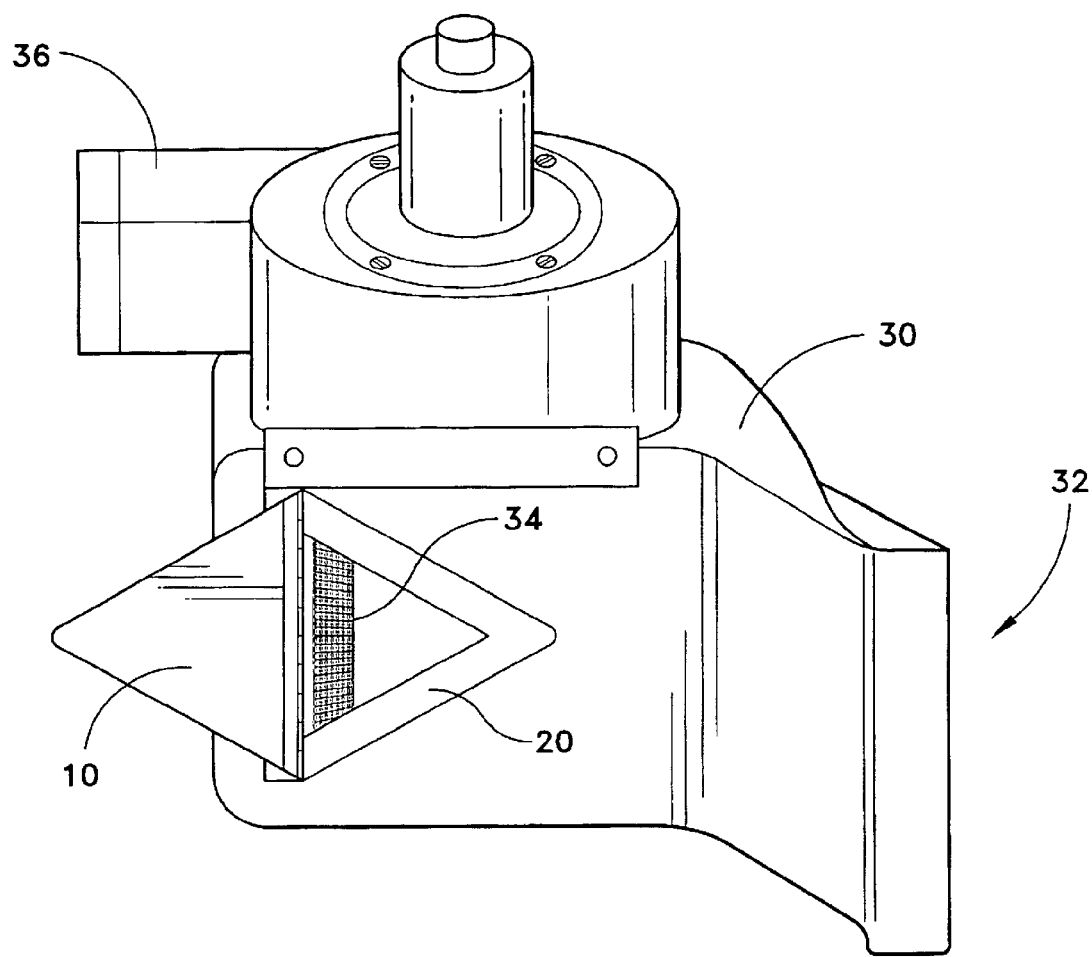
FIG. 2 is an environmental, perspective view of an air conditioner coil housing having an access door according to the present invention with the access door in an open position and the evaporator coil visible.

The present invention is a method and kit for installing a hinged access door onto an OEM air conditioning coil housing to facilitate cleaning of the evaporator coil within the housing. Referring to the drawings, FIGS. 1 and 2 show a hinged access door 10 attached to an air conditioning coil housing 30 that, for illustrative purposes, is substantially identical to such a housing used in Peterbilt (™) trucks manufactured after about 1996.

Air enters the housing 30 through inlet 32, is cooled by heat exchange with the evaporator coil 34, and exits the housing through outlet 36. The air may be distributed from the outlet 36 through the cab of the vehicle by ducting (not shown for clarity). An air filter (not shown) is mounted in the inlet end 32 and disposed between the inlet 32 and the evaporator coil 34. However, the air filter is usually insufficient to prevent the build-up of dust, dirt, and other particles on the evaporator coils. The present invention provides an access door 10 in the housing 30 between the air filter and the evaporator coil 34 which permits cleaning of the evaporator coil 34 by cleaning fluid and vacuuming. When open, as shown in FIG. 2, the hinged access door 10 provides access to the evaporator coil 34 for ease of cleaning.

Figure 3:
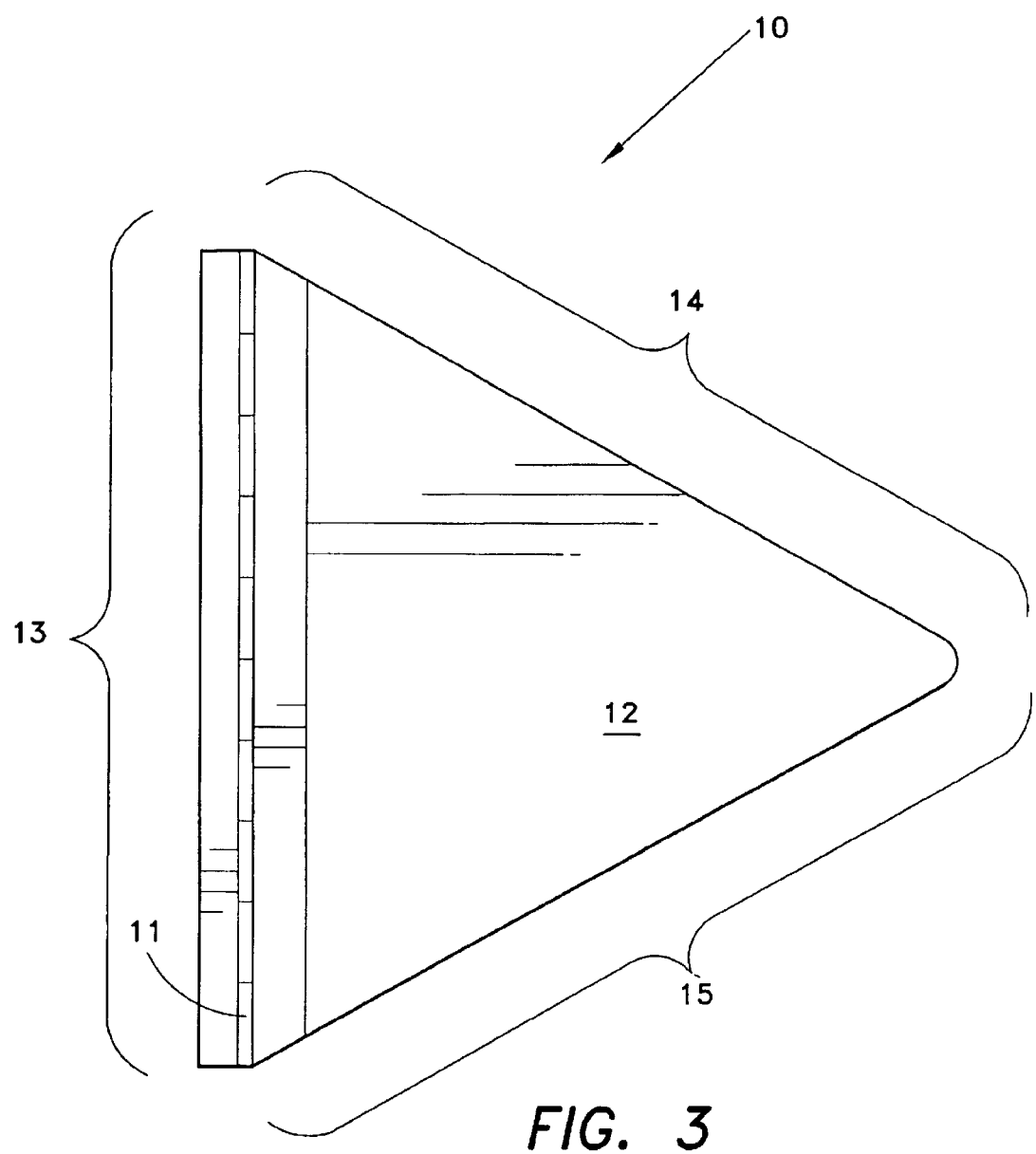
FIG. 3 is a front elevational view of a hinged access door of an air conditioning coil access door kit according to the present invention.
Figure 5:
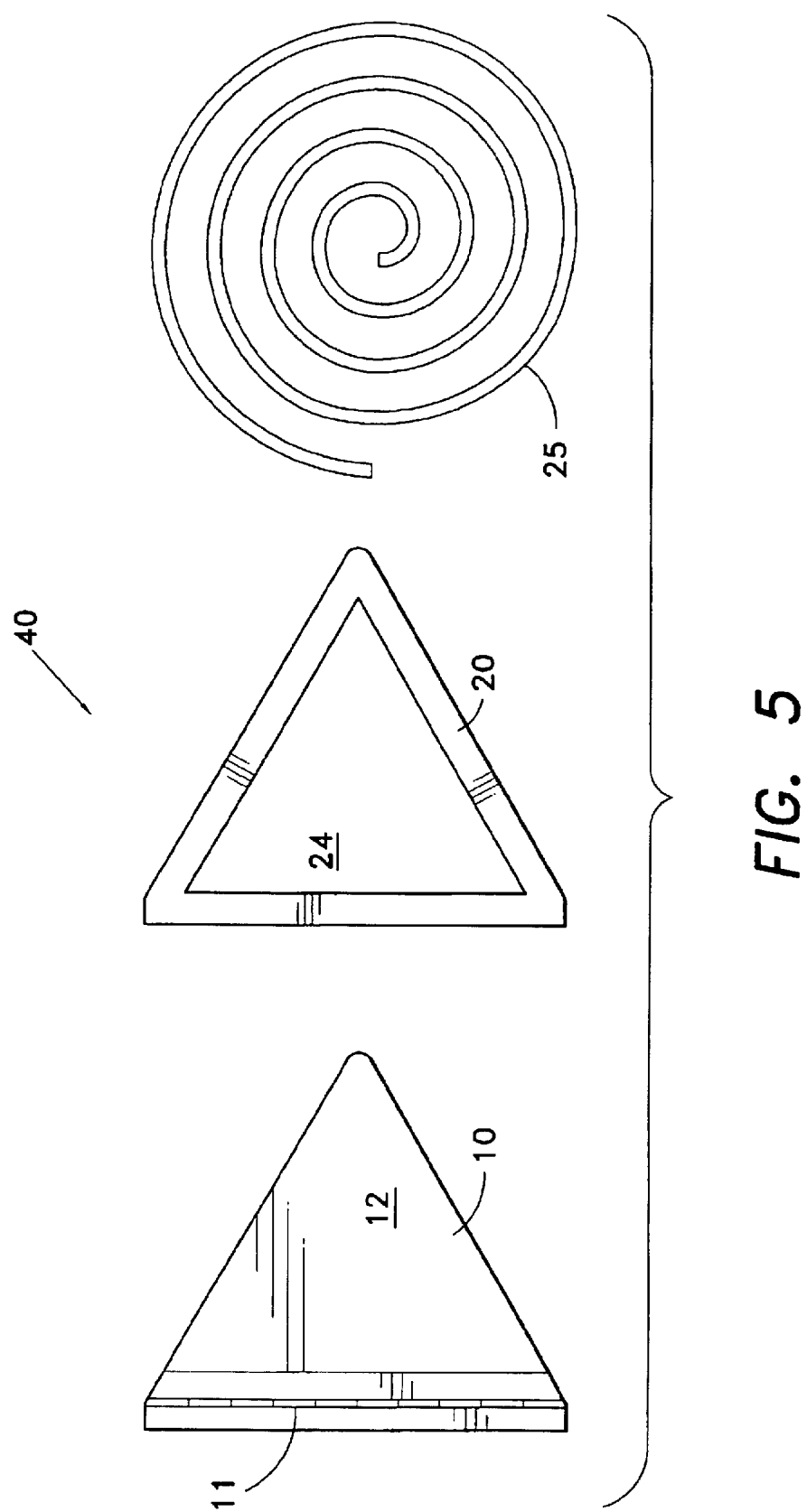
FIG. 5 is a plan view of an air conditioner coil access door kit according to the present invention.

As shown in FIG. 5, the kit 40 includes a template 20, a hinged access door 10, and double-sided adhesive tape 25. The hinged access door 10, shown in isolation in FIG. 3, includes a door panel 12 is flat and substantially triangular in shape with a hinge 11 disposed along one edge. The hinged access door 10 is constructed of clear plastic and the hinge 11 is attached to the door 12 via an adhesive. The hinge 11 may be a piano or knuckle joint hinge as shown. Alternatively, the hinge 11 and door 12 may be an integral unit made from plastic, the hinge 11 being a living hinge.

Figure 4:
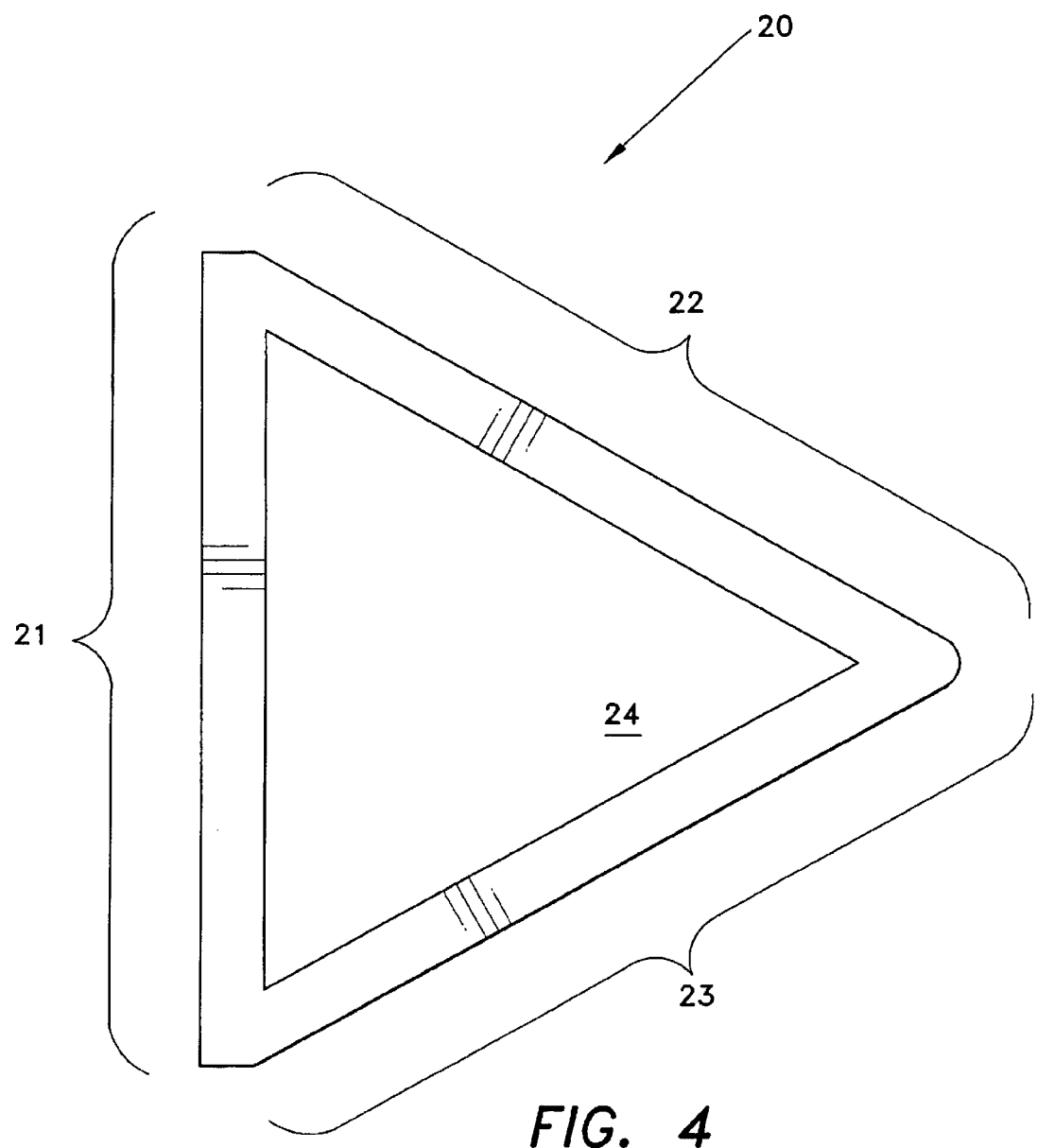
FIG. 4 is a front elevational view of a template for an air conditioning coil access door kit according to the present invention.

The template 20, shown in isolation in FIG. 4, is also flat and substantially triangular in shape. The outside dimensions 21, 22 and 23 of the template 20 are substantially the same as those 13, 14 and 15 of the hinged access door 10 such that when the hinged access door 10 is placed on top of the template 20 the outer edges of the hinged access door 10 substantially align with those of the template 20. The template 20 defines a triangular opening 24 that is used as a cutting guide to define an access opening in the housing 30 as set forth below.

A method for installing the kit comprises the steps of removing the trim cover from the air conditioner housing; attaching the template to the housing with double-sided adhesive tape; cutting an opening in the housing, using the template as a template; attaching the hinged side of the hinged access door to the template with double-sided adhesive tape so that the door covers the opening in the housing when closed; and replacing the trim cover.

With the hinged access door installed, servicing the unit includes opening the access door, slightly moistening the evaporator coil with a cleaning solution, vacuuming the coil with a wet/dry vacuum equipped with a 45° nozzle, repeating the process if necessary, allowing the coil to dry, and closing the door. The air filter may be replaced when the evaporator coil is cleaned.

It will be understood that the present invention extends not only to an aftermarket kit for modifying Original Equipment Manufacturer (OEM) air conditioning systems, but also to an OEM housing 30 having an opening defined therein between the air filter and the evaporator coil, and a hinged door 10 disposed on the housing 30 having an open position permitting access to the evaporator coil 34, and a closed position covering the opening defined in the housing 30. The invention particularly extends to a housing wherein the opening is dimensioned and configured for permitting insertion of a vacuum cleaner nozzle having a flat blade ending in a 45° defining the nozzle orifice through the opening.

It will further be understood that although the invention has been described for illustration on the air conditioning system of a Peterbilt semi-truck, the present invention may be installed in the air conditioning system of a variety of other structures, including other makes and models of semi-trucks, automotive vehicles in general, residential homes, commercial buildings, motor homes and travel trailers, boats, air craft and buses.

It is to be understood that the present invention is not limited to the embodiments described above, but encompasses any and all embodiments within the scope of the following claims.

I claim:

1. A kit for installing an air-conditioner coil access door, comprising:

a template adapted for attachment to an air conditioner coil housing between an air filter and an evaporator coil, the template defining an opening dimensioned and configured for receiving a vacuum cleaner nozzle passed therethrough;

an access door having a hinge attached thereto, the hinge being attachable to the template; and means for attaching the template to the air conditioning coil housing;

wherein the opening defined by the template is adapted for use as a cutting guide in order to form an access opening in the air conditioner coil housing, the access door pivoting between an open position providing access to the evaporator coil and a closed position covering the template.

2. The kit according to claim 1, wherein said template and said hinged access door are each substantially flat, having three outer edges substantially forming a triangle.

3. The kit according to claim 2, wherein the opening defined by said template is substantially triangular in shape.

4. The kit according to claim 2, wherein said template and said hinged access door each define an isosceles triangle having one side dimensioned about eight inches in length and two sides about five and three quarter inches in length.

5. The kit according to claim 1, wherein said means for attaching said template to the air conditioning coil housing comprises double-sided adhesive tape.

6. The kit according to claim 1, further comprising double sided adhesive tape attaching the hinge to said template.

7. The kit according to claim 1, wherein said access door and said template are made from plastic.

8. The kit according to claim 1, wherein said access door and said hinge are formed as an integral unit.

9. An air conditioner coil housing, comprising:

a tubular housing having an air intake end and an air outlet end, the housing being adapted for having an air filter mounted at the intake end, the housing having an access opening defined therein;

an evaporator coil mounted within the housing between the intake end and the outlet end, the access opening being dimensioned and configured for insertion of a vacuum cleaner nozzle therethrough for cleaning the evaporator coil;

an access door dimensioned to cover the access opening; and a hinge pivotally attaching the door to the housing, the access door pivoting between an open position providing access to the evaporator coil through the access opening, and a closed position covering the access opening, and a template attached to the housing beneath the hinge and access door, the template defining a guide hole equal in dimension to the access opening.

* * * * *